C. H. PRÖTT.
APPARATUS FOR DETERMINING THE AMOUNT OF HEAT IN THE AIR.
APPLICATION FILED FEB. 20, 1914.
1,400,313.
Patented Dec. 13, 1921.
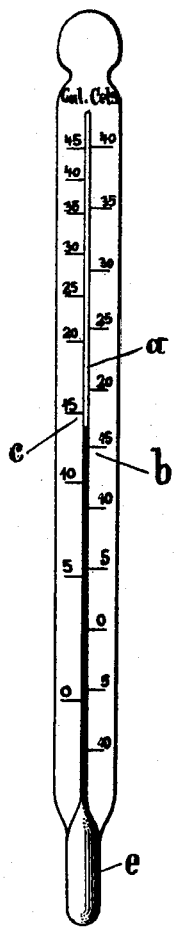

UNITED STATES PATENT OFFICE.

CARL HEINRICH PRÖTT, OF RHEYDT, GERMANY.

APPARATUS FOR DETERMINING THE AMOUNT OF HEAT IN THE AIR.

1,400,313.   Specification of Letters Patent.   Patented Dec. 13, 1921.

Application filed February 20, 1914. Serial No. 819,958.

(GRANTED UNDER THE PROVISIONS OF THE ACT OF MARCH 3, 1921, 41 STAT. L., 1313.)

*To all whom it may concern:*

Be it known that I, CARL HEINRICH PRÖTT, a subject of the German Emperor, residing at Rheydt, in Rhenish Prussia, Prussia, Germany, have invented certain new and useful Improvements in Apparatus for Determining the Amount of Heat in the Air, of which the following is a specification.

Hitherto the determination of the amount of heat contained in the air necessitated a very troublesome calculation, impossible to the general public, and involved also several accurate measurements.

In order to ascertain the total heat, which is composed of the so-called sensible heat or free heat of the air together with the latent heat of the water vapor contained in it, the usual procedure has hitherto been first, to determine the relative or percentage amount of moisture in the air at the given temperature by means of a hygrometer, then to look up in a table the amount of moisture necessary to saturate the air at the given temperature, and then from this figure to calculate the absolute amount of moisture contained in a cubic meter of air in grams of water. After this the heat units could only be determined by further calculation, since for every cubic meter of air, the sensible heat must be reckoned with 0.306 calories per degree of temperature and in addition the latent heat with 0.5948–0.6139 calories, according as the temperature varies from 0°–40° C. for every gram of water vapor.

In order now to be able to follow the rise or fall of total heat from time to time, it was always necessary to make such laborious calculations over again, or to make use of tables containing millions of figures, from which one could only partly find out the values in question.

Both methods are so troublesome and take up so much time, that one was generally satisfied in determining only the temperature from the dry bulb thermometer, without regarding the actual heat, so that a false impression of the real amount of existing heat was obtained, and the body experienced a different sensation of warmth, without having a directly readable measurement for it.

The present invention relates to a new instrument which, in contradiction to the afore-mentioned troublesome and time-taking methods determines the total heat contained in a cubic meter or kilogram of air directly by a single reading.

This new instrument consists, according to the invention, in a wet bulb thermometer the scale of which, in addition to or instead of the usual scale of thermometric degrees is graduated in heat units (calories). Such a scale may be arranged either on the thermometer itself or separated from it and may be either fixed or revoluble (for recording instruments).

The fact that, by means of such a scale the actual total heat can at once be read off on a wet bulb thermometer seems at first astonishing, since the total heat is made up of the heat of the dry air (sensible heat) together with the heat of the water vapor contained in the air (latent heat) and of these the sensible heat only corresponds to the temperature of the dry bulb thermometer, so that the omission of the dry bulb thermometer appears to be inadmissible.

That the invention is however practicable, and the manner in which the desired scale of heat units for the wet bulb thermometer may be obtained with sufficient accuracy for many cases, will be apparent from the following considerations.

Hitherto it has already been possible to calculate the total heat of the air from simultaneous observations of the dry and wet bulb thermometers and assuming a normal height of barometer, from the following approximate formula.

$$\text{(Total heat) (calories)} = 0.306t + 0.603(f_1 - 0.64(t - t_1))$$

Where $t$ is the reading of the dry-bulb thermometer in degrees centigrade.

Where $t_1$ is the reading of the wet-bulb thermometer in degrees centigrade.

Where $f_1$ is the amount of moisture required for saturation in grams per cubic meter as obtained from a table, corresponding to the temperature, $t_1$.

A determination of the total heat in this way necessitates taking two readings on different thermometers, looking up the corresponding values of $f_1$ in a table and a calculation according to the formula given above. This method on account of its clumsiness is not usual in practice, but it is useful in the present instance in order to make clear the essence of the invention.

By multiplication and addition the above equation may be reduced to the following form:—

Total heat, calories=
$$0.386t_1 + 0.603f_1 - 0.08t.$$

The first and second terms of the right-hand side of this last equation are both functions of $t_1$, i. e. they depend only on the temperature of the wet bulb thermometer, while the last term $0.08t$ may be regarded solely as a correcting term and on account of its proportionately small value may be entirely neglected, or better still, when measurements, not far from the temperature of the room are in question can be considered as a constant.

The equation is then obtained in the form:

Calories=$F_1(t_1) + F_2(t_1) + C$. ($F_1$ and $F_2$ being function of $t_1$) and from this, by inserting the different values for $xt_1$, the scale of total heat for the wet bulb thermometer may be calculated.

In this way fairly accurate values are obtained, and any inaccuracies are solely due to the formula employed above which is only an approximate formula, while an absolutely exact scale may be manufactured by using other calculations which are however even more troublesome.

The accompanying drawing shows in front elevation a wet-bulb thermometer, adapted as a calorimeter in accordance with the invention, $a$ is a simple thermometer which is adapted as a so-called wet bulb thermometer in the usual manner e. g. by having an opaque ground glass bulb $c$ at the lower end or by covering it with damp cloth. The thermometer $a$ in consequence of the evaporation taking place around the bulb always shows a lower temperature than that of the surrounding air. On the right-hand side the scale $b$, which is graduated in degrees of temperature is fitted, on the left hand side on the contrary, a scale $c$ graduated in units of heat in accordance with this invention is fitted. This scale is determined in the above described or in other suitable manner, and from it can be read off immediately the total heat contained in the air. The new instrument may therefore, if desired be used with a dry bulb as an ordinary thermometer, or by wetting the ground glass bulb as a wet bulb thermometer, i. e. as a calorimeter, and in the latter case the total heat contained in the air may be read off on the scale.

What I claim as my invention and desire to secure by Letters Patent:—

In apparatus for determining the amount of heat in the air, a wet-bulb thermometer having a scale graduated in heat units in a given amount of air and including those in the moisture in such air.

In testimony whereof, I have signed my name to this specification in the presence of two subscribing witnesses.

CARL HEINRICH PRÖTT. [L. S.]

Witnesses:
HELEN NUFER,
ALBERT NUFER.